United States Patent
Peake et al.

(10) Patent No.: US 9,020,757 B2
(45) Date of Patent: Apr. 28, 2015

(54) PATH PLANNING AUTOPILOT

(75) Inventors: John W Peake, Mountain View, CA (US); Stephan Pleines, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 270 days.

(21) Appl. No.: 13/470,028

(22) Filed: May 11, 2012

(65) Prior Publication Data

US 2013/0304300 A1 Nov. 14, 2013

(51) Int. Cl.
*G05D 1/00* (2006.01)
*B62D 15/02* (2006.01)
*A01B 69/04* (2006.01)
*G05D 1/02* (2006.01)

(52) U.S. Cl.
CPC .......... *B62D 15/025* (2013.01); *A01B 69/008* (2013.01); *G05D 1/0217* (2013.01); *G05D 1/0278* (2013.01); *G05D 2201/0201* (2013.01)

(58) Field of Classification Search
CPC ..... G05D 1/0213; G05D 1/00; G05D 1/0011; G05D 1/0088; G05D 1/021; G05D 1/0223; G05D 1/0227
USPC ............ 701/50, 41, 23, 24, 25, 26, 400, 409, 701/448; 180/68, 204, 443, 444
See application file for complete search history.

(56) References Cited

U.S. PATENT DOCUMENTS

| | | | |
|---|---|---|---|
| 6,377,889 B1 | 4/2002 | Soest | |
| 6,549,849 B2 | 4/2003 | Lange | |
| 6,609,065 B1 | 8/2003 | Lange | |
| 7,363,154 B2 | 4/2008 | Lindores | |
| 7,383,114 B1 | 6/2008 | Lange | |
| 7,477,976 B2 * | 1/2009 | Horii et al. | 701/49 |
| 7,689,354 B2 * | 3/2010 | Heiniger et al. | 701/412 |
| 7,835,832 B2 * | 11/2010 | Macdonald et al. | 701/24 |
| 8,131,415 B2 | 3/2012 | Peake | |
| 8,224,525 B1 * | 7/2012 | Rapoport et al. | 701/41 |
| 2004/0193348 A1 * | 9/2004 | Gray et al. | 701/50 |
| 2004/0193349 A1 * | 9/2004 | Flann et al. | 701/50 |
| 2005/0075785 A1 * | 4/2005 | Gray et al. | 701/202 |
| 2005/0096802 A1 * | 5/2005 | Han et al. | 701/4 |
| 2006/0167600 A1 * | 7/2006 | Nelson et al. | 701/23 |
| 2006/0282205 A1 * | 12/2006 | Lange | 701/50 |
| 2007/0021913 A1 * | 1/2007 | Heiniger et al. | 701/213 |
| 2008/0027599 A1 * | 1/2008 | Logan et al. | 701/23 |
| 2008/0215203 A1 * | 9/2008 | Dix et al. | 701/26 |

(Continued)

FOREIGN PATENT DOCUMENTS

| | | |
|---|---|---|
| JP | 05-257529 A | 10/1993 |
| JP | 08-241123 A | 9/1996 |

(Continued)

OTHER PUBLICATIONS

International Search Report and Written Opinion of the International Searching Authority in PCT/US2013/040169, Aug. 24, 2013.

(Continued)

*Primary Examiner* — John R Olszewski
*Assistant Examiner* — Truc M Do
(74) *Attorney, Agent, or Firm* — NUPAT, LLC; Morrison Ulman

(57) ABSTRACT

A path planning autopilot guides vehicles efficiently even when they are far from a desired path.

39 Claims, 18 Drawing Sheets

(56) References Cited

U.S. PATENT DOCUMENTS

| | | | |
|---|---|---|---|
| 2008/0249692 A1* | 10/2008 | Dix | 701/50 |
| 2008/0263912 A1* | 10/2008 | Gharsalli et al. | 37/382 |
| 2008/0275602 A1* | 11/2008 | Peake | 701/25 |
| 2009/0037041 A1* | 2/2009 | Senneff et al. | 701/23 |
| 2009/0099730 A1* | 4/2009 | McClure et al. | 701/41 |
| 2009/0118904 A1 | 5/2009 | Birnie | |
| 2009/0204281 A1* | 8/2009 | McClure et al. | 701/25 |
| 2009/0216406 A1* | 8/2009 | Senneff et al. | 701/42 |
| 2009/0292412 A1* | 11/2009 | Han et al. | 701/25 |
| 2009/0326763 A1* | 12/2009 | Rekow | 701/42 |
| 2010/0185364 A1* | 7/2010 | McClure | 701/41 |
| 2010/0204866 A1* | 8/2010 | Moshchuk et al. | 701/25 |
| 2011/0118926 A1 | 5/2011 | Peake | |
| 2011/0196565 A1* | 8/2011 | Collins et al. | 701/26 |
| 2011/0224873 A1* | 9/2011 | Reeve et al. | 701/41 |
| 2012/0053832 A1* | 3/2012 | Irish et al. | 701/448 |
| 2012/0109610 A1* | 5/2012 | Anderson et al. | 703/8 |
| 2012/0197495 A1* | 8/2012 | Senneff et al. | 701/42 |
| 2012/0248253 A1* | 10/2012 | Cheetham | 244/158.8 |
| 2013/0009014 A1* | 1/2013 | Bordetsky et al. | 244/189 |

FOREIGN PATENT DOCUMENTS

| | | |
|---|---|---|
| JP | 09-094006 A | 4/1997 |
| WO | 2008118027 A2 | 10/2008 |

OTHER PUBLICATIONS

T. Fraichard and A. Scheuer, "From Reeds and Shepp's to Continuous-Curvature Paths", IEEE Transactions on Robotics, v. 20, p. 1025, Dec. 2004.

D. Wilde, "Computing Clothoid Segments for Trajectory Generation", IEEE/RSJ International Conference on Intelligent Robots and Systems, p. 2440, Oct. 2009.

* cited by examiner

PATH PLANNING AUTOPILOT

TECHNICAL FIELD

The disclosure is generally related to automatic control systems for vehicles.

BACKGROUND

Guiding a farm tractor, construction vehicle, mining truck, army tank or other large vehicle according to a precise, desired path often saves time and energy compared to sloppy operating. Precise farm tractor control, for example, benefits farmers, consumers and society as a whole. Farmers are able to work more efficiently, and spend less money on fertilizers and pesticides. Consumers enjoy lower prices for high quality produce, and precise use of farm land and farm chemicals reduces waste and excess runoff.

Autopilot systems that guide farm tractors, spray trucks, harvesters and the like with high accuracy and repeatability contribute to efficient land and chemical use. For example, fields are often sprayed with booms 90-feet-wide or even larger. When using such a wide boom it would seem prudent to allow a few feet of overlap from one spray swath to the next. However, the overlap may be reduced to just inches if the tractor or spray truck is equipped with a high performance autopilot. The savings accrued from not double-spraying swath edges add up quickly on large area farms.

Existing autopilot systems are adequate for keeping vehicles on a predefined path. These autopilots are based on feedback control techniques and they can make a large farm tractor, for example, follow a line within one or two inches cross-track error. FIG. 1A shows a vehicle following a path under feedback control; vehicle 105 follows path 110. When the cross track error, XTE, is smaller than the vehicle wheelbase, b, the vehicle is in a small signal regime or "close" to the desired path.

Feedback autopilots do not perform as well when a vehicle is far off from a desired path. Common situations where this occurs include joining a path from far away or turning around at the end of a path to join a nearby path. FIG. 1B shows a vehicle with a possible path 125 that could result from using a small-signal feedback autopilot in a large-signal regime. Vehicle 115 is guided by a feedback autopilot toward path 120. When the cross track error is larger than the vehicle wheelbase, the vehicle is in the large signal regime or "far" from the desired path.

With conventional feedback autopilots, tradeoffs exist between performance in the small signal regime and acceptable behavior in the large signal regime. For example, high feedback gain that keeps cross track error small in the small signal regime may result in steep approaches to a desired path and oscillation when joining the path as shown in FIG. 1B. Conventional autopilots avoid undesirable large-signal behavior by invoking heuristic limits when large deviations from a desired path are encountered. These limits mean that large-signal guidance is not as efficient as it could be.

In the examples above wheelbase is used as an example of a characteristic length scale to divide small and large signal regimes. Other characteristic lengths may be used; e.g. distance traveled in a characteristic autopilot response time. More generally, the small signal regime refers to any situation where a vehicle autopilot behaves as a linear, time-invariant system. The large signal regime, on the other hand refers to situations where non-linear behavior, such as steering angle limits or steering angle rate limits, occurs.

What is needed is a vehicle autopilot that offers high performance guidance regardless of whether a vehicle is near or far from a desired path. The autopilot should not only keep a vehicle on a path, but also guide it efficiently to join a path from any starting point.

DETAILED DESCRIPTION

Introduction

Figure 1A:
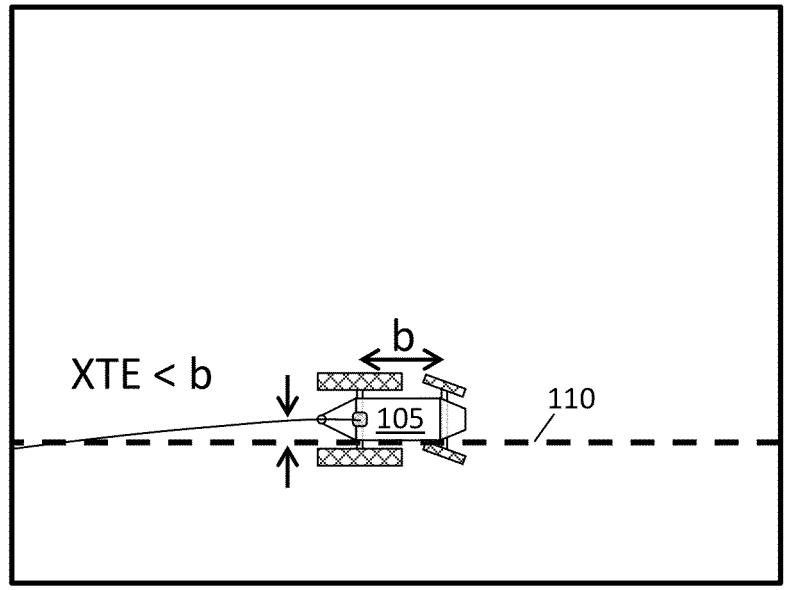
FIG. 1A shows a vehicle following a path under feedback control.
Figure 1B:
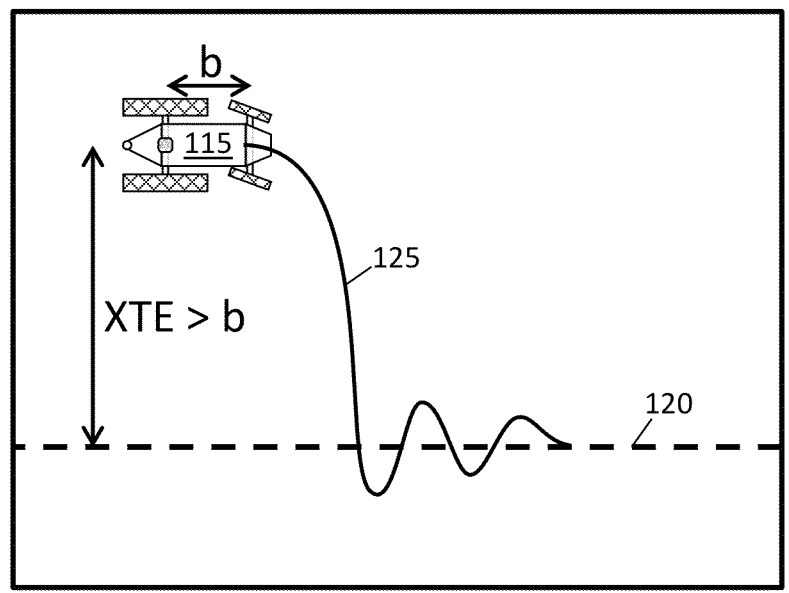
FIG. 1B shows a vehicle with a possible path that could result from using a small-signal feedback autopilot in a large-signal regime.
Figure 2A:
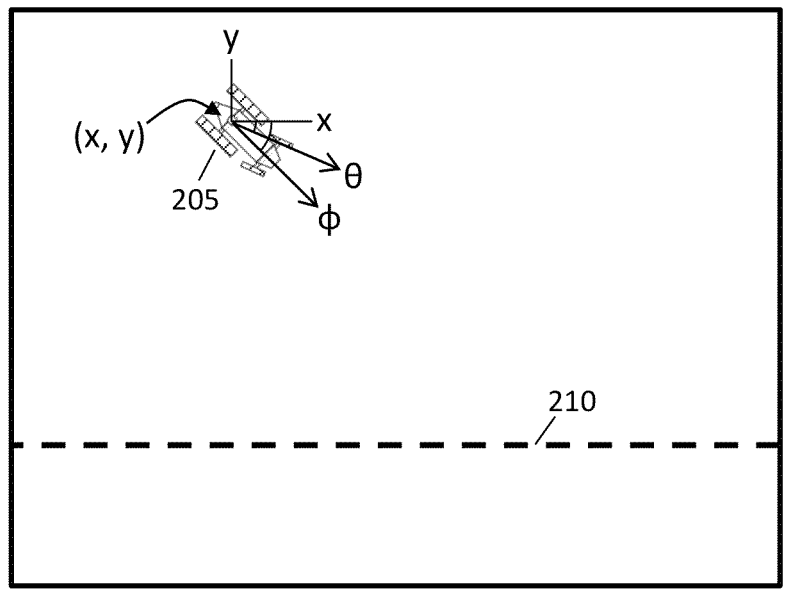
FIG. 2A shows a vehicle characterized by an arbitrary position (x, y), heading ($\phi$), and curvature ($\theta$); and a desired path for the vehicle to follow.
Figure 2B:
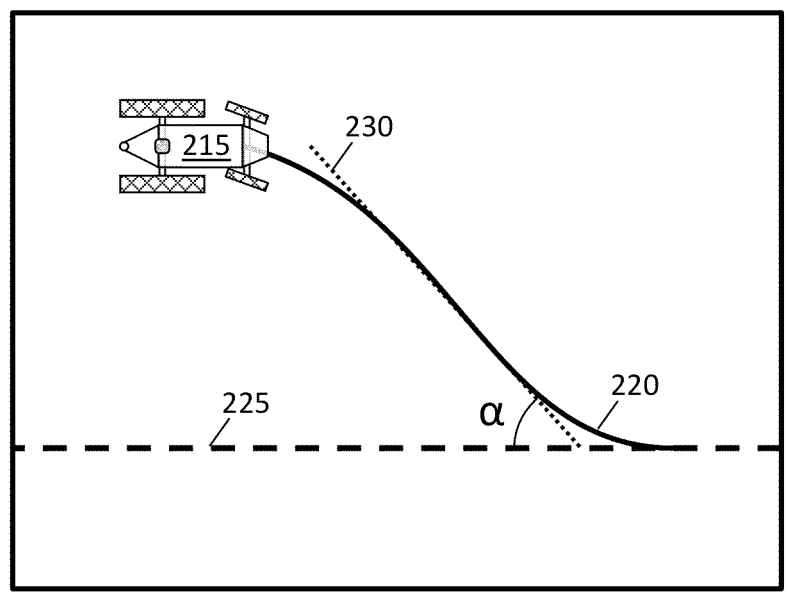
FIG. 2B shows a vehicle following a planned path to join a desired path.

The path planning autopilot described below provides more sophisticated vehicle guidance than is possible with a conventional autopilot. FIG. 2A shows a vehicle 205 in a configuration defined by an arbitrary position (x, y), heading ($\phi$), and curvature ($\theta$); and a desired path 210 for the vehicle to follow. A path planning autopilot creates an efficient joining path that takes the vehicle from an arbitrary initial configuration (y, $\phi$, $\theta$) to a desired path. The initial configuration may be near or far from the desired path. As an example, FIG. 2B shows a vehicle 215 following a planned path 220 to join a desired path 225.

Unlike conventional autopilots, a path planning autopilot offers direct control over constraints such as maximum permitted steering angle or maximum steering angle rate. Such constraints may be specified as functions of vehicle speed. Path planning techniques may be implemented as a complementary feed-forward capability of a feedback autopilot or they may replace feedback all together.

Figure 3:
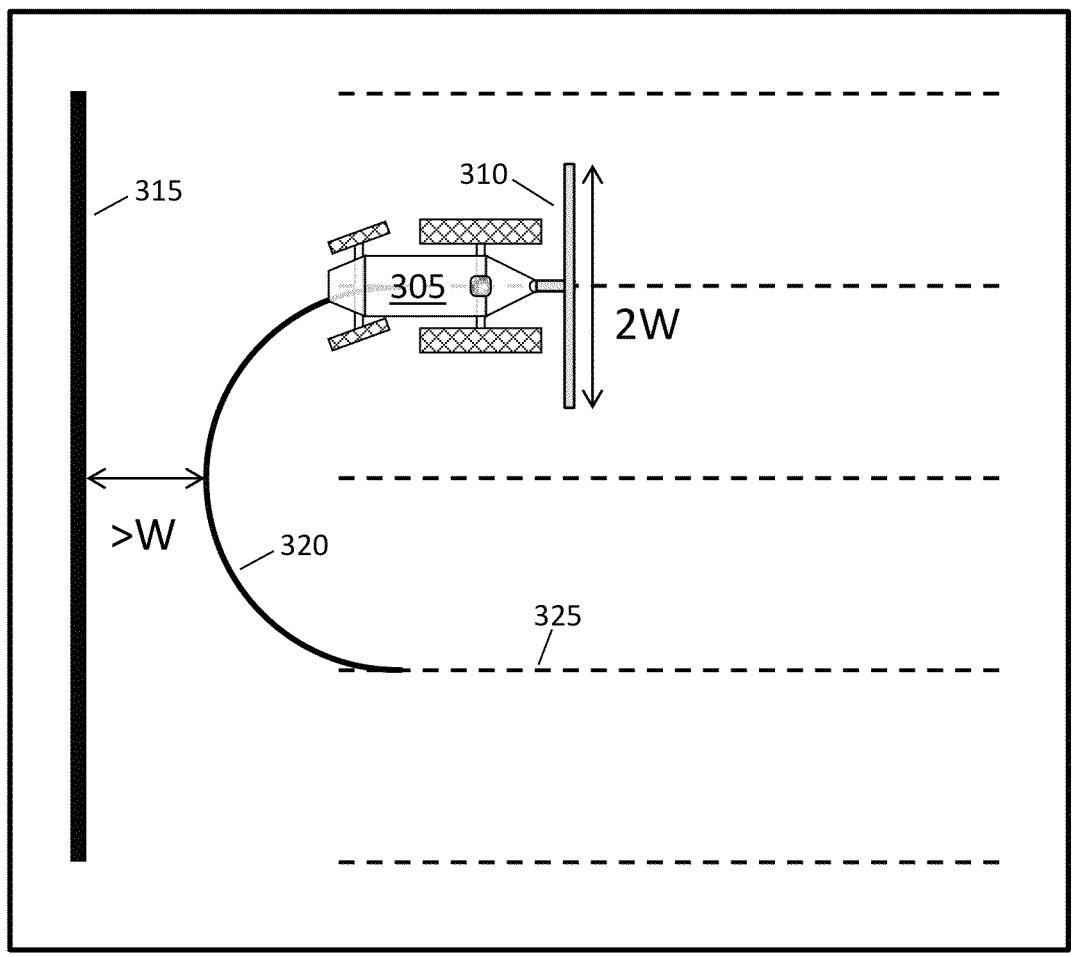
FIG. 3 shows a turn-around path planned for a tractor towing an implement inside a field boundary.

Many advanced maneuvers are possible with a path planning autopilot. Paths may be joined at up to specified maximum angles such as a, the angle between dotted line 230 and desired path 225 in FIG. 2B. A desired path may be joined in a specified direction, a capability that is used in turn-arounds. FIG. 3 shows a turn-around path planned for a tractor 305 towing an implement 310 inside a field boundary 315. Planned path 320 is designed to keep implement 310 more than an implement half-width, W, from the boundary. Planned path 320 joins desired path 325 in a direction opposite to the tractor's present heading.

System Overview

A path planning autopilot calculates an efficient path for a vehicle to follow. The autopilot guides the vehicle along this path using a pure feedback or a combined feed-forward and feedback control architecture. Two different approaches for calculating efficient paths are described.

A typical scenario that illustrates the utility of a path planning autopilot is joining a desired path. In farming, for example, a tractor operator may wish to join predefined, straight line for planting, spraying or harvesting. There is no requirement to join the line at any particular position. Rather, the operator would simply like to join the line in the least time within constraints of comfortable operation.

The joining path that guides a vehicle from its initial position to a desired line has continuous curvature, restricted to be less than a maximum curvature limit. This means that the joining path has no sharp corners and takes into account practical limits on how fast a vehicle can change its curvature and heading.

For wheeled vehicles, curvature is determined by wheel steering angle and wheelbase. Path planning autopilots may be used with truck-like vehicles having two steerable wheels and two or more fixed wheels, center hinge vehicles, tracked vehicles, tricycle vehicles, etc. Some vehicle control systems accept curvature as a direct input rather than steering angle.

Joining paths are calculated assuming constant vehicle speed. Joining paths may be recalculated whenever speed changes or they may be recalculated periodically regardless of whether or not vehicle speed has changed.

Joining paths are constructed as a series of straight line, circular and clothoid segments. Clothoids are used to join segments of different, constant curvature; e.g. to join a line and a circular arc. The curvature of a clothoid changes linearly with curve length. Clothoids are also called Euler spirals or Cornu spirals. Reasonable approximations to clothoids may also be used.

Figure 4:
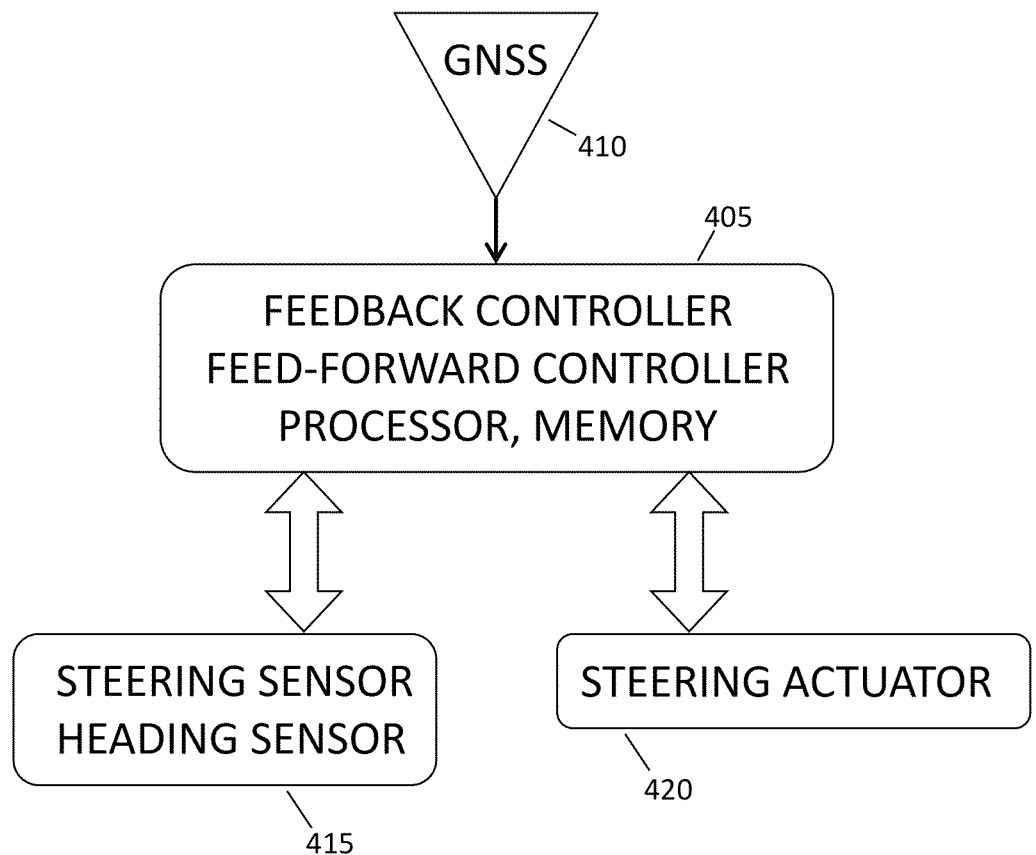
FIG. 4 is a block diagram of a path planning autopilot including feedback and feed-forward controllers.

FIG. 4 is a block diagram of a path planning autopilot including feedback and feed-forward controllers. The autopilot includes a main unit 405 having a feedback controller, a feed-forward controller, a processor and memory. Functional blocks of the main unit may be implemented with general purpose microprocessors, application-specific integrated circuits, or a combination of the two.

The main unit receives input from GNSS (global navigational satellite system) receiver 410 and sensors 415. The main unit sends output to actuators 420. GNSS receiver 410 may use signals from any combination of Global Positioning System, Glonass, Beidou/Compass or similar satellite constellations. The receiver may use differential corrections provided by the Wide Area Augmentation System and/or real-time kinematic positioning techniques to improve accuracy. The receiver provides the main unit with regular position, velocity and time updates.

Sensors 415 include steering sensors that report vehicle steering angle and heading sensors that report vehicle heading to the main unit. Heading may be sensed from a combination of GNSS and inertial measurements. Steering angle may be sensed by a mechanical sensor placed on a steering linkage or by inertial measurements of a steering linkage. Sensors 415 may also be omitted if heading and curvature of vehicle track are estimated from GNSS measurements alone.

Actuators 420 include a steering actuator to steer a vehicle. A steering actuator may turn a vehicle's steering wheel or tiller, or it may control a steering mechanism directly. On some vehicles steering actuators operate hydraulic valves to control steering linkages without moving the operator's steering wheel.

Figure 5:
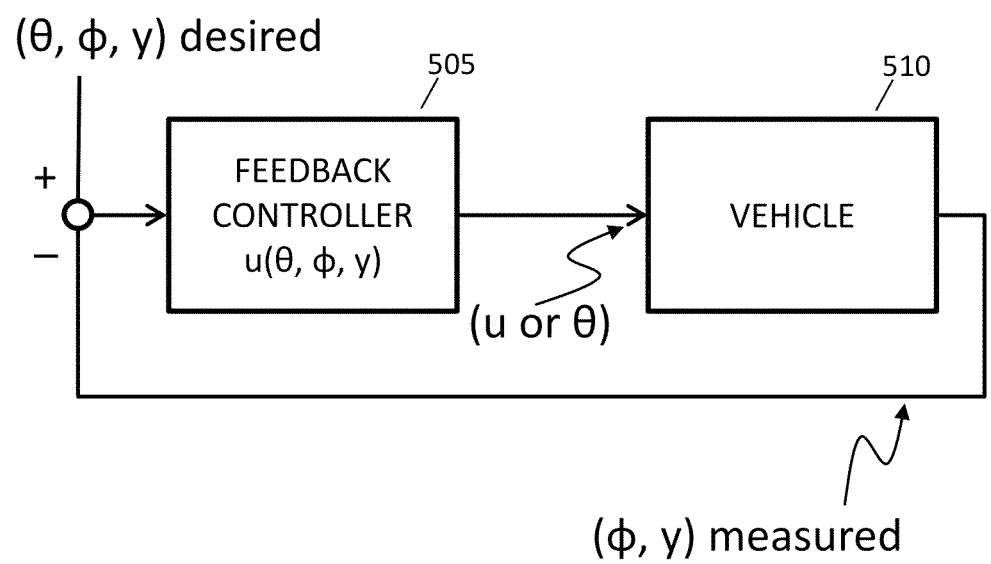
FIG. 5 is a block diagram of a feedback control system based on path planning algorithms.

A path planning autopilot may include many other functions, sensors and actuators. For simplicity, only some of those pertinent to path planning operations have been included in FIG. 4. A display and user input devices are examples of components omitted from FIG. 4. User input may be necessary for system tuning, for example. The system of FIG. 4 may operate in different modes, three of which are illustrated in FIGS. 5, 6 and 7.

A path planning autopilot may use path planning techniques in a feedback control system or it may use path planning in a combined feedback/feed-forward control system. FIG. 5 is a block diagram of a feedback control system based on path planning algorithms. In FIG. 5, feedback controller 505 controls vehicle 510 by sending curvature rate (u) or curvature ($\theta$) command signals to it. Actual vehicle heading ($\phi$) and cross track error (y) as measured by a GNSS receiver, heading sensor and/or other sensors are combined with desired curvature, heading and track ($\theta$, $\phi$, y) to form an error signal for controller 505.

The method used by controller 505 to determine u or $\theta$ is described in detail below. At this point suffice it to say that the controller repeatedly calculates a joining path to guide the vehicle from its present position to a desired path, and generates control commands that cause the vehicle to follow the joining path. The controller is not based on conventional proportional-integral-derivative (PID) techniques.

Figure 6:
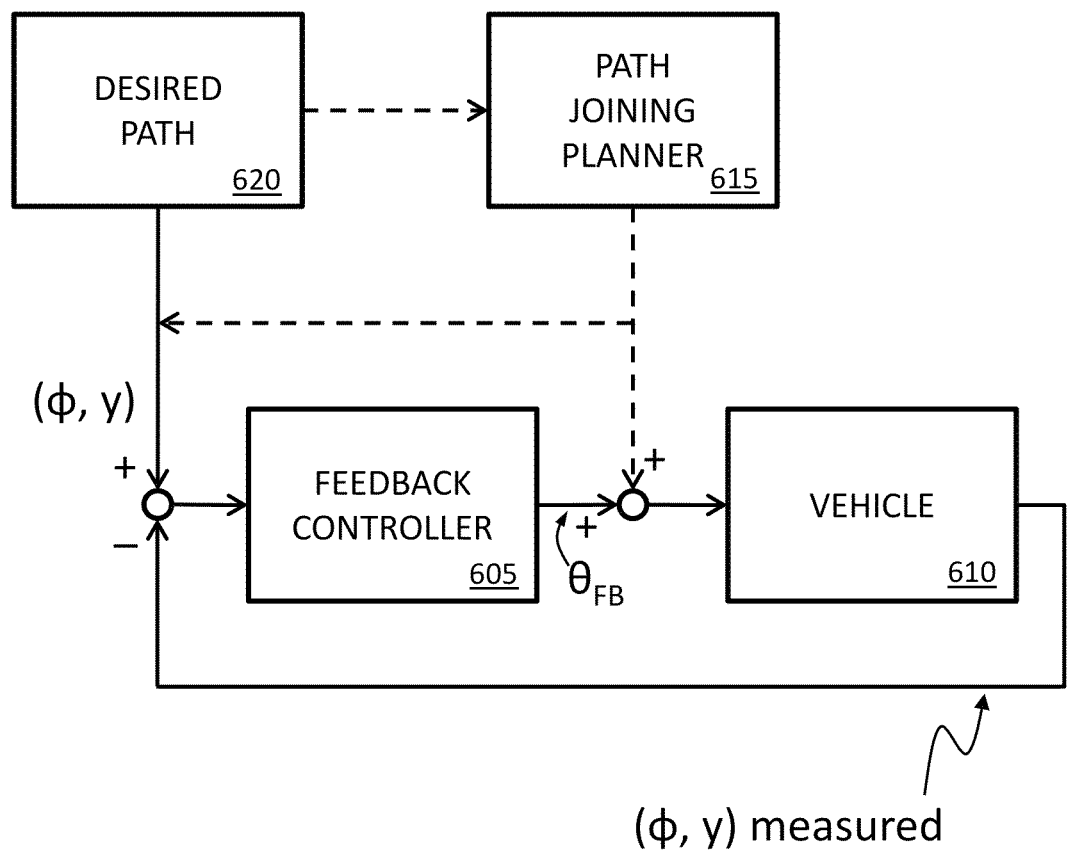
FIG. 6 is a block diagram of a feedback and feed-forward control system in feedback mode.
Figure 7:
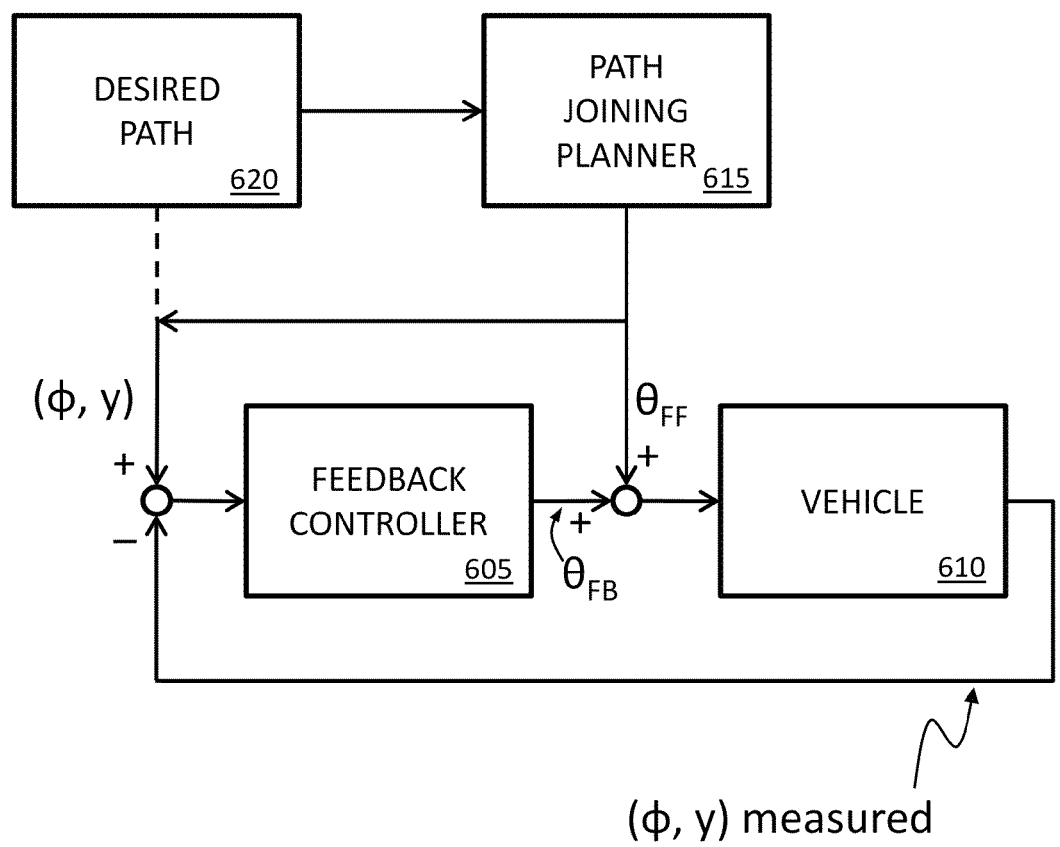
FIG. 7 is a block diagram of a feedback and feed-forward control system in combined feedback and feed-forward mode.

FIGS. 6 and 7 are block diagrams of a feedback and feed-forward control system in feedback, and combined feedback and feed-forward modes, respectively. In FIGS. 6 and 7, feedback controller 605 controls vehicle 610 by sending curvature ($\theta$) commands to it. (Alternatively, feedback controller 615 may send curvature rate (u) commands to the vehicle.) Actual vehicle heading ($\phi$) and cross track error (y) as measured by a GNSS receiver, heading sensor and/or other sensors are combined with parameters of a desired path 620 to form an error signal for controller 605. Feedback controller 605 may be a conventional PID controller unlike feedback controller 505.

In FIGS. 6 and 7, solid arrows represent active signal paths, while dashed arrows represent signal paths that are turned off. Thus in FIG. 6, feedback controller uses an error signal derived from the difference between measured and desired paths to generate feedback control signal $\theta_{FB}$. This mode may be used when the vehicle is close to the desired path.

When the vehicle is far from a desired path, the control system switches to the mode illustrated in FIG. 7. A typical scenario in which a vehicle is far from a desired path is when an autopilot system is engaged before the vehicle is established on the path. A set of parallel swaths may have been created to guide a tractor over a farm field, for example, and the tractor operator may want the autopilot to guide the tractor to the nearest one. When this happens, path joining planner 615 calculates an efficient path from the vehicle's present position to the desired path.

Path joining planner 615 calculates a joining path to guide the vehicle to the desired path and provides a feed-forward control signal, $\theta_{FF}$, which is combined with feedback control signal $\theta_{FB}$ to guide vehicle 610. For purposes of feedback controller 605, the joining path is the desired path until the original desired path 620 is reached. Thus feedback reference signal ($\phi$, y) is derived from the path joining planner during that time. The path joining planner is the feed-forward mechanism described in connection with FIG. 4. Methods used by the feed-forward, path joining planner are described in detail below.

Alternatively, once path joining planner 615 calculates a joining path, that joining path continuing onto the original desired path (from the point where the joining path meets the original path) may become the new desired path. The original desired path before the point where the joining path meets it may then be discarded.

Autopilots having a path-planning, feedback and feed-forward control system like that of FIGS. 6 and 7 may use a switch to alternate between modes. The mode is selected based on vehicle distance from desired path 620; near the path feedback control is used, far from it combined feed-forward and feedback control is used. Criteria to determine "near" and "far" may be based on characteristic lengths such as vehicle wheelbase or distance travelled in a characteristic response time, or whether or not steering angle or steering angle rate limits are encountered.

Alternatively, a control system may operate in the mode illustrated in FIG. 7 continuously. When the vehicle is near the desired (620) path, output signals from the path joining planner are small and may have negligible practical influence on the feedback control system. Thus, the path joining planner may be kept online all the time.

FIGS. 5-7 show measured ($\phi$, y) data being combined with desired path data and then sent to feedback controller 505 or 605. However, measured data could alternatively be estimated by an observer, e.g. a Kalman filter, before being combined with desired path data.

Two different approaches for calculating efficient joining paths are described in detail below: an integral approach and an iterative approach. Each approach is first described in terms of planning paths to join the straight line y=0. Extensions to joining curves are discussed later. Symbols used in the discussion below are defined in Table 1.

TABLE 1

Symbol definitions.

| (x, y) | position |
|---|---|
| $\phi$ | heading |
| $\theta$ | curvature |
| u | curvature rate |

These terms are used to describe vehicle configuration and characteristics of paths that vehicles follow.

Integral Approach

The time evolution of a continuous curvature trajectory in the x-y plane is described by:

$$\frac{d}{dt}\begin{bmatrix} x(t) \\ y(t) \\ \phi(t) \\ \theta(t) \end{bmatrix} = \begin{bmatrix} v \cdot \cos\phi(t) \\ v \cdot \sin\phi(t) \\ v \cdot \theta(t) \\ u(t) \end{bmatrix} \quad (1)$$

A vehicle following a trajectory defined by (1) has heading $\phi$, curvature $\theta$, and curvature rate u. The vehicle's velocity is v.

The problem to be solved is: Find a path that leads a vehicle onto a target line in the least amount of time, subject to constraints. The target line to be joined is the x axis (y=0) and x position may be dropped from consideration entirely. Since (1) is invariant with respect to time, the initial time may be set to t=0.

A formal statement of the optimal control problem is: Find a piecewise continuous solution for u for all times from t=0 to t=$t_f$ such that constraints (2)-(6) below are met and the final time, $t_f$, is minimized.

$$\begin{bmatrix} y(0) \\ \phi(0) \\ \theta(0) \end{bmatrix} = \begin{bmatrix} y_0 \\ \phi_0 \\ \theta_0 \end{bmatrix} \quad (2)$$

$$|\phi_0| \leq \pi \quad (3)$$

$$\begin{bmatrix} y(t_f) \\ \phi(t_f) \\ \theta(t_f) \end{bmatrix} = \begin{bmatrix} 0 \\ \phi_f \\ 0 \end{bmatrix} \quad (4)$$

$$\frac{d}{dt}\begin{bmatrix} y(t) \\ \phi(t) \\ \theta(t) \end{bmatrix} = \begin{bmatrix} v \cdot \sin\phi(t) \\ v \cdot \theta(t) \\ \mu \cdot u(t) \end{bmatrix} \quad (5)$$

$$|\theta(t)| \leq \theta_{max} > 0 \quad (6)$$

Here $\theta_{max}$ is the maximum allowed curvature and $\mu$ is the maximum allowed rate of change of curvature. $\mu$ normalizes u such that $|u| \leq 1$. (Note: $\mu > 0$) Equations (2) and (3) represent initial conditions; equation (4) represents final conditions. Equation (5) represents the dynamics of the problem, while equation (6) is a constraint on curvature.

Physically, $\phi = \phi \pm n \cdot 2\pi$, so $\phi_f = n \cdot 2\pi$ where n is an integer. In some cases, heading may be restricted. For example, one may require that a vehicle approach a target line on a heading no greater than a maximum angle away from the line. In that case $|\phi(t)| \leq \phi_{max}$ where $0 < \phi_{max} \leq \pi$.

The problem just described is complicated. Rather than solve it directly, it is easier to consider a simpler problem: Calculate a path that leads a vehicle from its initial heading and curvature to some desired final heading and zero curvature. In other words, ignore the y coordinate or cross track error. The statement of the control problem now becomes: Find a piecewise continuous solution for u ($-1 \leq u \leq 1$) for all times from t=0 to t=$t_f$ such that constraints (7)-(10) below are met and the final time, $t_f$, is minimized.

$$\begin{bmatrix} \phi(0) \\ \theta(0) \end{bmatrix} = \begin{bmatrix} \phi_0 \\ \theta_0 \end{bmatrix} \quad (7)$$

$$\begin{bmatrix} \phi(t_f) \\ \theta(t_f) \end{bmatrix} = \begin{bmatrix} \phi_f \\ 0 \end{bmatrix} \quad (8)$$

$$\frac{d}{dt}\begin{bmatrix} \phi(t) \\ \theta(t) \end{bmatrix} = \begin{bmatrix} v \cdot \theta(t) \\ \mu \cdot u(t) \end{bmatrix} \quad (9)$$

$$\theta(t) \in \{\theta \mid -\theta_{max} \leq \theta \leq \theta_{max}\} \quad (10)$$

Here $\phi_f \neq 0$ represents any desired final heading.

This problem is an example of the so-called "double integrator" problem, solutions to which are well known. The optimal input, u(t), is 0, 1 or −1 depending on the values of φ and θ. Let Δφ=φ−φ_f and $$\phi_c = \frac{v \cdot \theta_{max}^2}{2\mu},$$

and define:

$$f_1(\Delta\phi) = \sqrt{-\frac{2\mu}{v}\Delta\phi} \quad \text{for } -\phi_c \leq \Delta\phi \leq 0 \qquad (11)$$

$$f_2(\Delta\phi) = -\sqrt{\frac{2\mu}{v}\Delta\phi} \quad \text{for } 0 \leq \Delta\phi \leq \phi_c \qquad (12)$$

which may be combined as:

$$f_3(\Delta\phi) = -\text{sgn}(\Delta\phi) \cdot \sqrt{\frac{2\mu}{v}|\Delta\phi|} \quad \text{for } |\Delta\phi| \leq \phi_c. \qquad (13)$$

The optimal input, u(t)=ū(Δφ(t),θ(t)) is then:

$$\begin{array}{ll}
0 \text{ for} & \begin{array}{l} \Delta\phi = 0 \quad \theta = 0 \\ \Delta\phi > \phi_c \quad \theta = -\theta_{max} \\ \Delta\phi < -\phi_c \quad \theta = \theta_{max} \end{array} \\
1 \text{ for} & \begin{array}{l} \Delta\phi \geq \phi_c \quad \theta \neq -\theta_{max} \\ 0 \leq \Delta\phi \leq \phi_c \quad \theta > f_2(\Delta\phi) \\ -\phi_c \leq \Delta\phi < 0 \quad \theta \geq f_1(\Delta\phi) \end{array} \\
-1 \text{ for} & \begin{array}{l} \Delta\phi \leq \phi_c \quad \theta \neq \theta_{max} \\ -\phi_c \leq \Delta\phi \leq 0 \quad \theta < f_1(\Delta\phi) \\ 0 < \Delta\phi \leq \phi_c \quad \theta \leq f_2(\Delta\phi) \end{array}
\end{array} \qquad (14)$$

Figure 8:
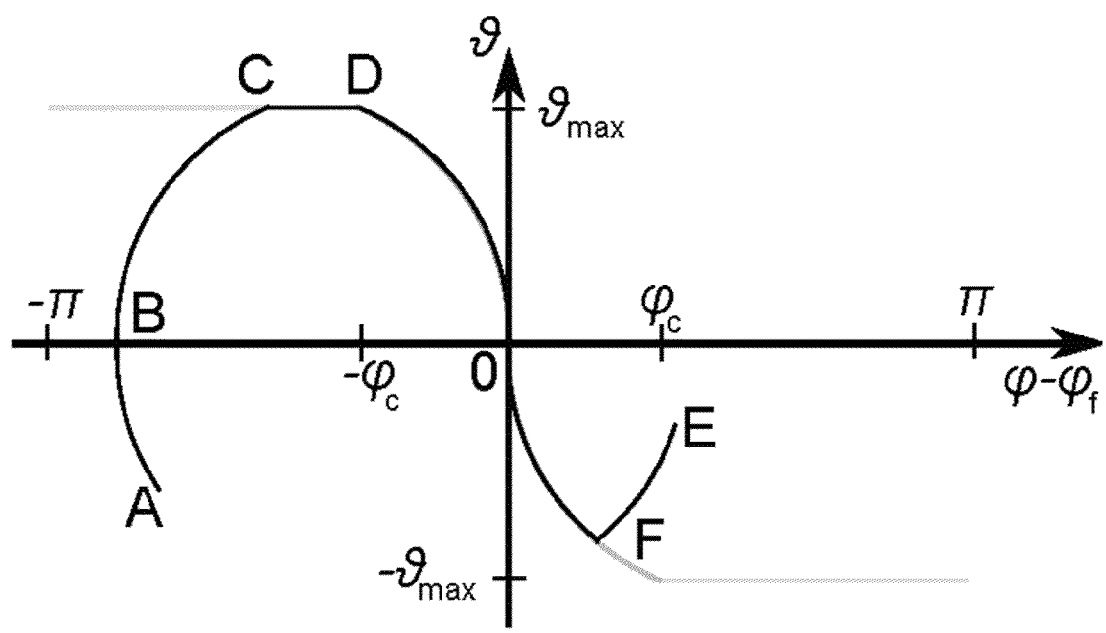
FIG. 8 is a feedback map for a double integrator system subject to constraints.

FIG. 8 is a feedback map for the double integrator system subject to constraints given above. The feedback map shows two example trajectories in the (Δφ, θ) plane. The first starts at A and ends at 0, while the second starts at E and ends at 0. Beginning at A, curvature (θ) increases until the maximum curvature limit is reached at C. The curvature changes sign at B. From C to D the curvature is maximum and constant. The curvature decreases from D to 0. The second example trajectory starts at E and ends at 0. Beginning at E, curvature decreases until F. Curvature then increases until 0 is reached.

When optimal inputs (14) are applied to a vehicle obeying equation (1), the vehicle executes optimal turns. Following the optimal (Δφ, θ) plane trajectories, from A to 0 or from E to 0, of FIG. 8 leads to optimal turns in the (x, y) plane. The optimal (Δφ, θ) plane trajectory from A to 0 leads to an optimal turn in the (x, y) plane constructed from clothoids (from A to B, B to C and D to 0) and a circular arc (from C to D). The optimal (Δφ, θ) plane trajectory from E to 0 leads to an optimal turn in the (x, y) plane constructed from two clothoids (from E to F and F to 0).

Thus, an optimal turn is defined as a path obtained by applying optimal double-integrator inputs (14) to continuous curvature equation (1). Optimal turns consist of: (i) a clothoid, (ii) a circular arc followed by a clothoid, (iii) a clothoid followed by a clothoid, or (iv) a clothoid followed by a circular arc followed by a clothoid. In theory optimal turns guide a vehicle to a target configuration (e.g. zero heading and curvature) in minimum time. In practice optimal turns may at least be used to create an efficient joining path from an initial configuration to a target configuration while obeying heading, curvature, curvature rate or other constraints.

The approach described above may now be extended to account for cross track error. The control problem statement becomes: Find a piecewise continuous solution for u (−1≤u≤1) for all times from t=0 to t=t_f such that constraints (15)-(18) below are met and the final time, t_f, is minimized.

$$\begin{bmatrix} y(0) \\ \phi(0) \\ \theta(0) \end{bmatrix} = \begin{bmatrix} y_0 \\ \phi_0 \\ \theta_0 \end{bmatrix} \qquad (15)$$

$$\begin{bmatrix} y(t_f) \\ \phi(t_f) \\ \theta(t_f) \end{bmatrix} = \begin{bmatrix} y_f \\ 0 \\ 0 \end{bmatrix} \qquad (16)$$

$$\frac{d}{dt}\begin{bmatrix} y(t) \\ \phi(t) \\ \theta(t) \end{bmatrix} = \begin{bmatrix} v \cdot \sin\phi(t) \\ v \cdot \theta(t) \\ \mu \cdot u(t) \end{bmatrix} \qquad (17)$$

$$\theta(t) \in \{\theta \mid -\theta_{max} \leq \theta \leq \theta_{max}\} \qquad (18)$$

The target line is the x-axis and φ_f=0. This problem and its solutions are invariant with respect to y so any trajectory may be shifted in y such that y_f=0. Equivalently, if y_0 is picked correctly, then y_f=0. That value of y_0 that results in y_f=0 is defined as ȳ(φ_0,θ_0).

Or, said another way: starting from initial conditions of heading, curvature and cross track error (φ_0, θ_0, y_0), an optimal turn to zero heading and zero curvature will end on the x-axis if y_0=ȳ(φ_0, θ_0). ȳ is found by integrating ∫y(t)dt backwards until a desired heading and curvature are reached for all permissible values of φ and θ:

$$y(t) = y_0 + \int_0^t v \cdot \sin(\phi(t))\,dt \qquad (19)$$

$$\phi(t) = \phi_0 + \int_0^t v \cdot \theta(t)\,dt \qquad (20)$$

$$\theta(t) = \theta_0 + \int_0^t \mu \cdot u(t)\,dt \qquad (21)$$

where appropriate u(t) is determined from (14).

Figure 9:
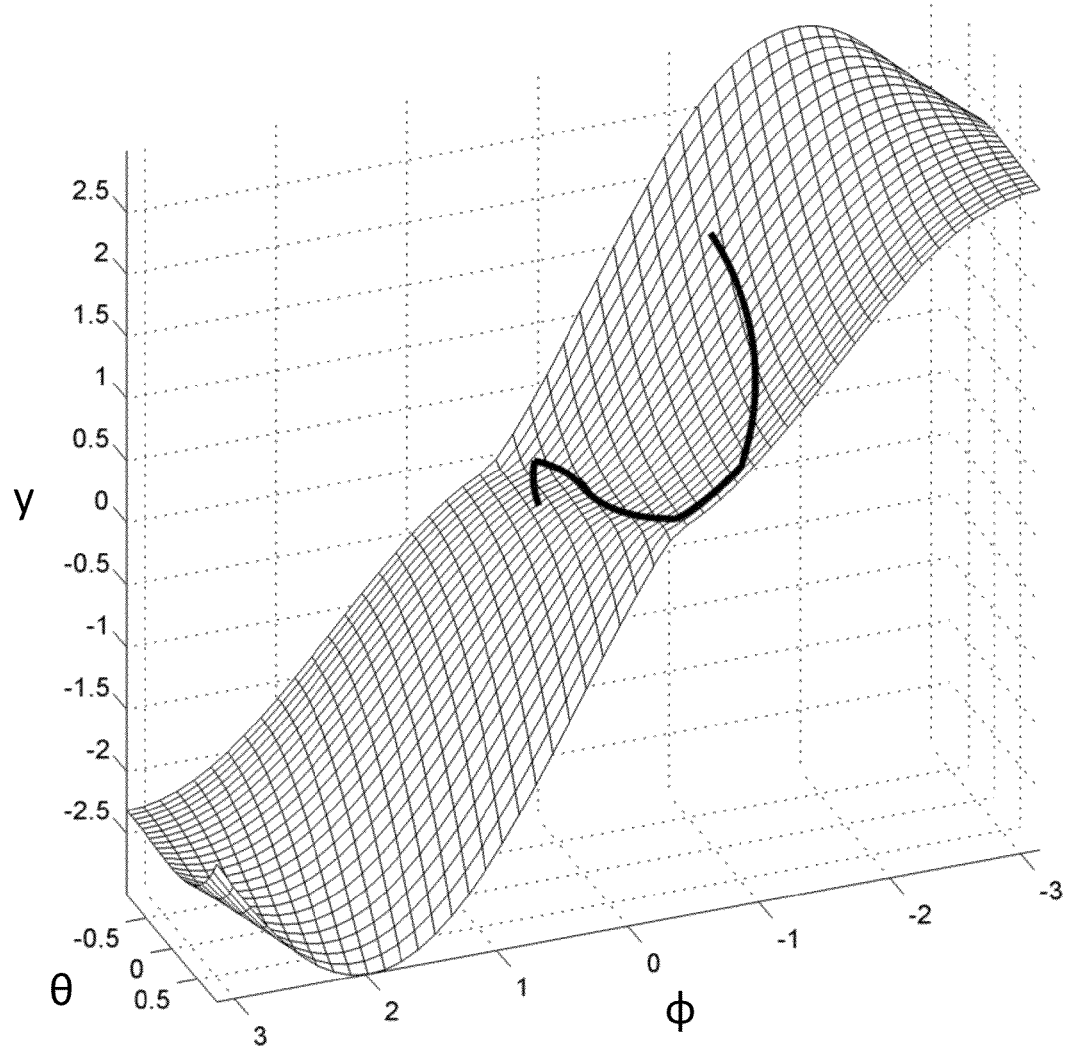
FIG. 9 is a plot of a surface representing cross track distance traveled during turns from all possible initial conditions of heading and curvature subject to constraints.

FIG. 9 is a plot of y=ȳ(φ,θ) for all allowed φ and θ. In FIG. 9, v=1, μ=0.6 and θ_max=50 degrees. All solutions for y(t_f)=φ(t_f)=θ(t_f)=0 lie on the ȳ(φ,θ) surface plotted. In particular, trajectories similar to those of FIG. 8 are plotted as a dark curve on the surface.

The solution of the whole problem, including cross track error, may now be specified for two cases: with and without heading constraints. When there are no heading constraints:

$$u(\phi(t), \theta(t), y(t)) = \begin{cases} \bar{u}(\phi - \phi_f, \theta) & \text{if } y(t) = \bar{y}(\phi, \theta) \\ \bar{u}\left(\phi - \phi_f - \frac{\pi}{2}, \theta\right) & \text{if } y(t) > \bar{y}(\phi, \theta) \\ \bar{u}\left(\phi - \phi_f + \frac{\pi}{2}, \theta\right) & \text{if } y(t) < \bar{y}(\phi, \theta) \end{cases} \qquad (22)$$

where the choice of φ_f=2πn (n being an integer) determines whether the first turn is to the right or left. In practice both possibilities may be calculated and whichever resulting trajectory is shorter may be used.

Solution (22) prescribes an optimal turn onto the target line if $y(t)=\bar{y}(\phi,\theta)$. If $y(t)\neq\bar{y}(\phi,\theta)$ then an optimal turn is made toward a line perpendicular to the target line; i.e. to a line heading $$\pm\frac{\pi}{2}.$$

A turn toward the perpendicular line, or subsequent travel along it, yields a trajectory that intersects with $$\begin{bmatrix} \bar{y}(\phi,\theta) \\ \phi \\ \theta \end{bmatrix} \quad (23)$$

hence a solution that reaches the final desired condition is always found.

When heading constraints are present:

$$u(\phi(t),\theta(t),y(t)) = \begin{cases} \bar{u}(\phi,\theta) & \text{if } y(t)=\bar{y}(\phi,\theta) \\ \bar{u}\!\left(\phi-\min(\phi_{max},\frac{\pi}{2}),\theta\right) & \text{if } y(t)>\bar{y}(\phi,\theta) \\ \bar{u}\!\left(\phi+\min(\phi_{max},\frac{\pi}{2}),\theta\right) & \text{if } y(t)<\bar{y}(\phi,\theta) \end{cases} \quad (24)$$

Solution (24) prescribes an optimal turn onto the target line if $y(t)=\bar{y}(\phi,\theta)$. If $y(t)\neq\bar{y}(\phi,\theta)$ then an optimal turn is made toward a line inclined at an angle $\min(\phi_{max},\pi/2)$ to the target line. (min(x, y) equals x or y, whichever is least.) The turn toward the line, or subsequent travel along it, yields a trajectory that intersects with $$\begin{bmatrix} \bar{y}(\phi,\theta) \\ \phi \\ \theta \end{bmatrix} \quad (25)$$

hence a solution that reaches the final desired condition is always found.

Solution (22) or (24) may be used in feedback controller 505 in FIG. 5.

Figure 10A:
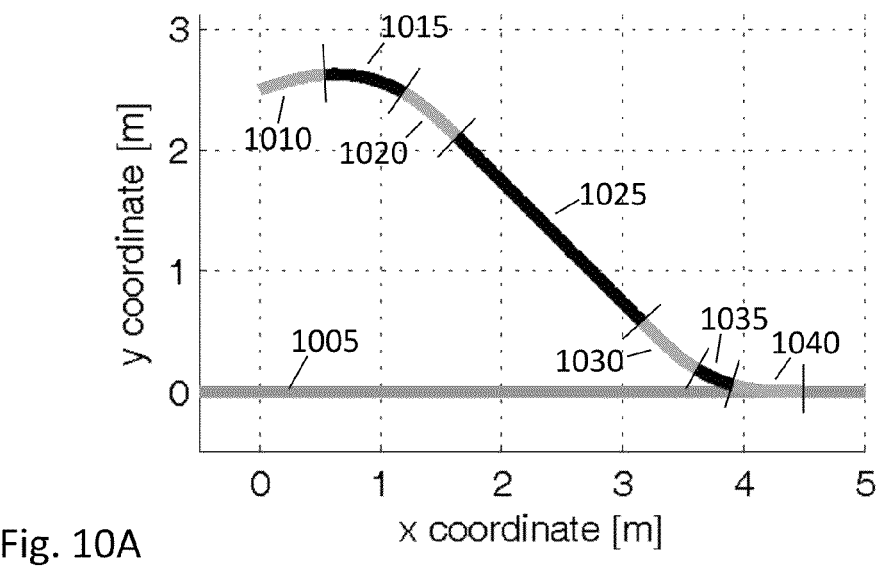
FIG. 10A shows an example path for a vehicle joining a straight line desired path.
Figure 10B:
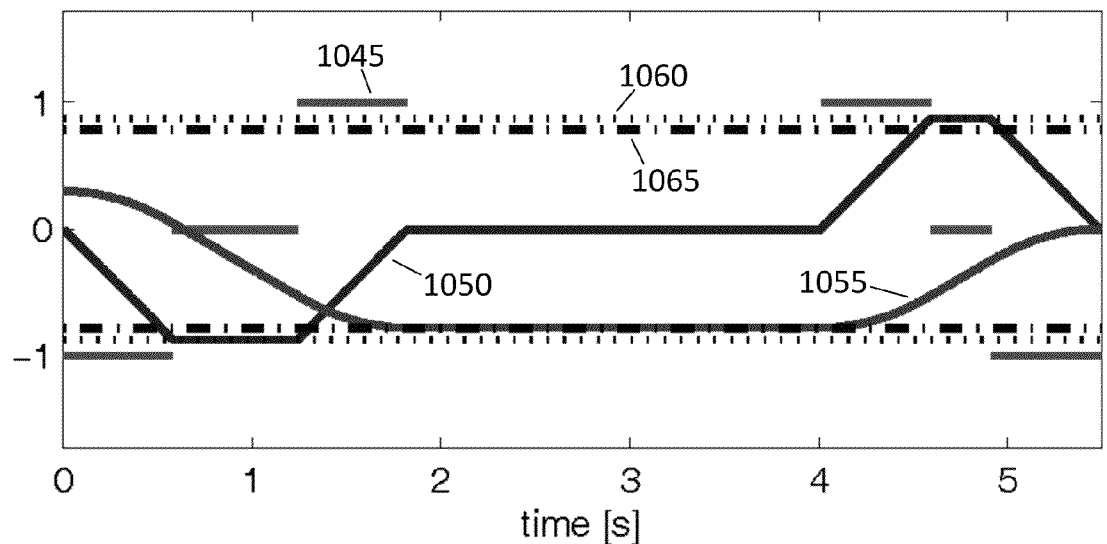
FIG. 10B shows u, $\theta$ and $\phi$ versus time for the path shown in FIG. 10A.

FIG. 10A shows an example path for a vehicle joining a straight line desired path while FIG. 10B shows u, θ and φ versus time for the path shown in FIG. 10A. In FIG. 10A, x-axis (y=0) 1005 is the target line to be joined. A joining path is shown that leads a vehicle from an initial condition ($y_0$=2.5, $\phi_0$=0.3, $\theta_0$=0) to the target line. The joining path is composed of clothoid 1010, circular arc 1015, clothoid 1020, straight line 1025, clothoid 1030, circular arc 1035 and clothoid 1040. In FIG. 10B, discontinuous line 1045 (for example) represents input u, piecewise continuous line 1050 represents curvature θ, smooth line 1055 represents heading φ, dotted lines 1060 represent a curvature limit, and dot-dash lines 1065 represent a heading limit. An optimal solution for u has only three possible values: 1, 0 or −1. The slope of curvature θ is flat during circular and straight line segments; the slope of θ during clothoid segments reflects the maximum allowed steering angle rate. Heading 1055 varies smoothly; its maximum slope reflects the maximum allowed steering angle.

Joining paths may be computed by solving (1) numerically and choosing u according to (22) or (24) at each time step. Alternatively (19), (20) and (21) may be integrated analytically and the x coordinate may be found from:

$$x(t) = x_0 + \int_0^t v\cdot\cos(\phi(t))\,dt \quad (26)$$

The following steps may be used to compute joining paths to target lines starting from an initial vehicle configuration [$y_0$ $\phi_0$ $\theta_0$]:

(1) (a) If $y_0=\bar{y}(\phi_0,\theta_0)$, then go to step (5).

(b) if $y_0 \neq \bar{y}(\phi_0,\theta_0)$ and $$\phi_0 = -\mathrm{sgn}(\phi_0)\cdot\phi_{max}\left(\text{or } \phi_0 = -\mathrm{sgn}(\phi_0)\cdot\frac{\pi}{2}\right)$$

and $\theta_0$=0, then go to step (3).

(c) Otherwise, continue to step (2).

(2) Compute an optimal turn onto a line inclined at an angle to the target line by $\pm\phi_{max}$ or $$\pm\frac{\pi}{2}.$$

Call the time at which this part of the trajectory ends $t_1$. Then:

(a) If $y(t_1)=\bar{y}(\phi(t_1),\theta(t_1))$, then go to step (5).

(b) If $y_0 \gtreqless \bar{y}(\phi_0,\theta_0)$ and $y(t_1) \lesseqgtr \bar{y}(\phi(t_1),\theta(t_1))$, then go to step (4).

(c) Otherwise, continue to step (3).

(3) Add a straight line until time $t_3$ where $t_3$ satisfies $y(t_3)=\bar{y}(\phi(t_3),\theta(t_3))$. Go to step (5).

(4) Find $t_2$, $t_0<t_2<t_1$, where $t_2$ satisfies $y(t_2)=\bar{y}(\phi(t_2),\theta(t_2))$. Discard the trajectory computed so far for all times $t>t_2$. Continue to step (5).

(5) Compute an optimal turn onto the target line.

Expressed without mathematical symbols these steps are, starting from any initial vehicle cross track error, heading and steering angle:

(1) (a) If the vehicle is at the right distance away from the target line to start the final turn, then go to step (5).

(b) If not, and if the heading is at the maximum allowed angle to the target line (or perpendicular to the target line) then go to step (3).

(c) Otherwise, continue to step (2).

(2) Compute an optimal turn onto a line inclined at the maximum allowed angle to the target line or perpendicular to it.

(d) If this turn ends at the right distance away from the target line to start the final turn, then go to step (5).

(e) If, at some point during this turn, the right distance away from the target line to start the final turn is reached, then go to step (4).

(f) Otherwise, continue to step (3).

(3) Add a straight line proceeding in the direction of the current heading ending at the right distance away from the target line to start the final turn; then go to step (5).

(4) Find the point at which the right distance was reached. Continuing from this point, go to step (5).

(5) Compute an optimal turn onto the target line.

Joining paths computed by steps (1)-(5) above include one or more clothoids and may also include circular arcs and straight lines. An example joining path structure is: clothoid-line-clothoid-arc-clothoid. 22 other combinations of clothoids, arcs and lines are possible. In general, a joining path from an arbitrary initial condition to a target line consists of: (i) an optimal turn, (ii) a line followed by an optimal turn, (iii) an optimal turn followed by an optimal turn, or (iv) an optimal turn followed by a line followed by an optimal turn. Note that the line specified in steps (2) and (3) may have zero length in which case one optimal turn is followed directly by another.

Figure 11:
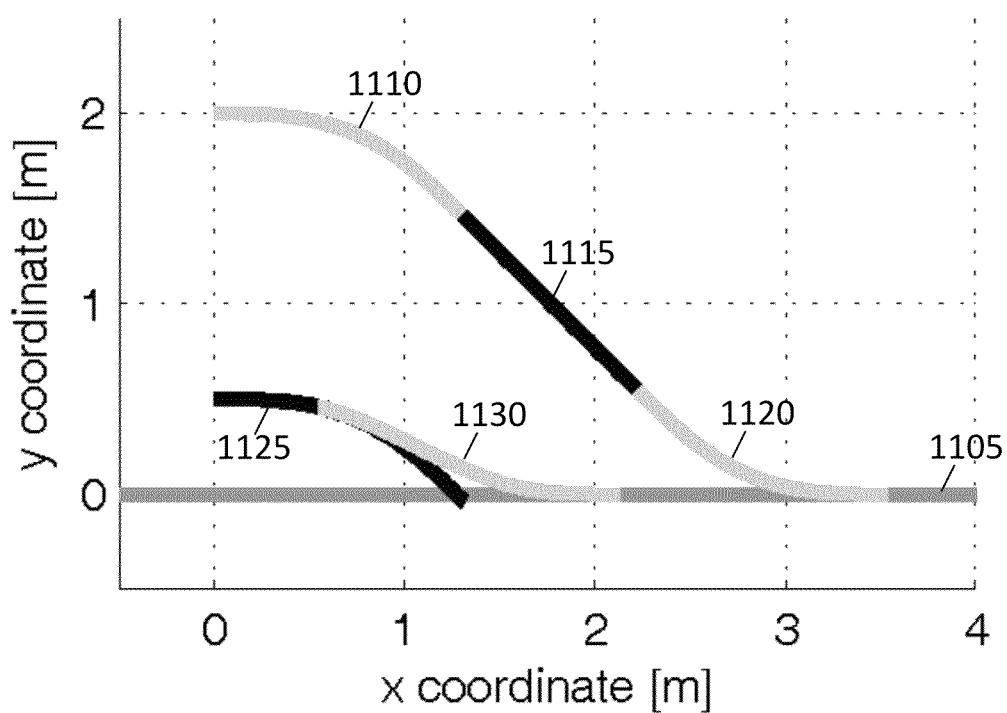
FIG. 11 shows two example joining paths.

FIG. 11 shows two example joining paths. In FIG. 11, x-axis 1105 is the target line. The longer joining path consists of an optimal turn 1110 to heading $$\frac{-\pi}{4},$$

a straight line 1115, and an optimal turn 1120 onto the target line. The shorter path shows how, following steps (4) and (5) above, an optimal turn 1125 to heading $$\frac{-\pi}{4}$$

got cut off at $\bar{y}$ and an optimal turn 1130 to the target line was added from that point. In both cases $$\frac{-\pi}{4}$$

is a maximum allowed approach heading ($\phi_{max}$) specified by a vehicle owner or operator.

Note that for the shorter path in FIG. 11, and other paths like it, instead of computing a complete turn according to step (2) and then finding where it crosses $\bar{y}$ according to step (4), one could check if $\bar{y}$ is reached at each point in as the turn is computed. Other, small procedural variations are no doubt possible.

Joining paths may be computed using the integral approach by the path joining planner of FIGS. 6 and 7.

Iterative Approach

Figure 12:
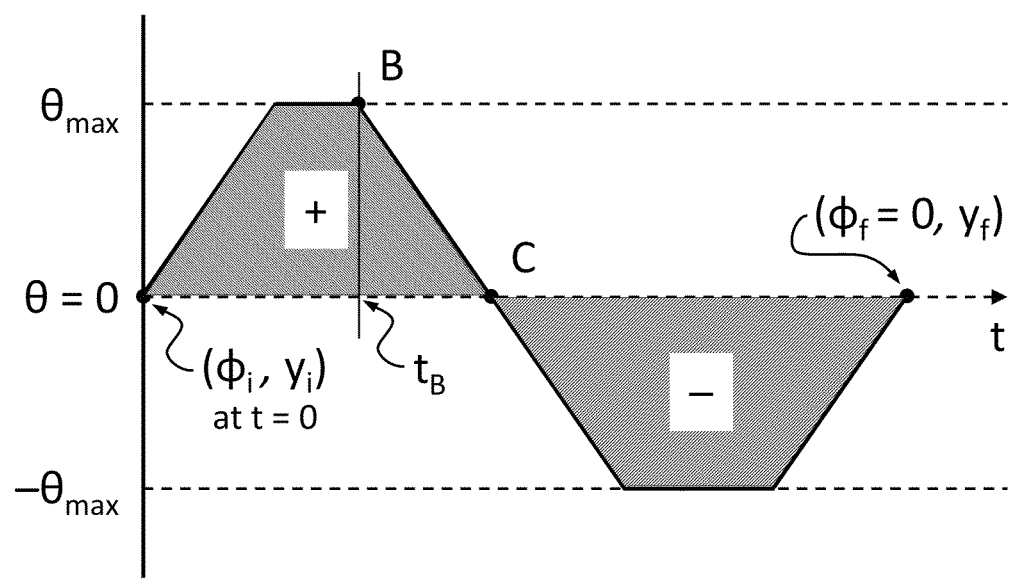
FIG. 12 is a first diagram of curvature versus time or distance used in an iterative path planning method.
Figure 13:
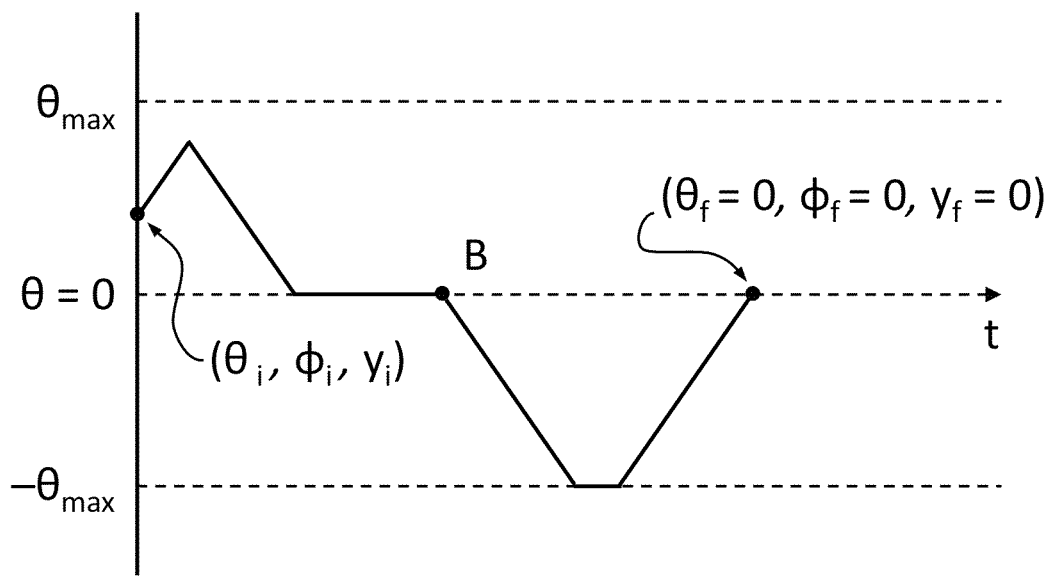
FIG. 13 is a second diagram of curvature versus time or distance used in an iterative path planning method.

An alternative approach to computing joining paths is based on consideration of curvature versus time (or distance) diagrams such as those shown in FIGS. 12 and 13. In this approach a turn toward a target line is initiated and allowed to progress for a certain amount of time. The consequences of the turn are then computed, the consequences being whether or not a turn in the opposite direction can be constructed that results in a trajectory that ends on the target line with zero heading and curvature. If a satisfactory turn is not achieved, the procedure is repeated with the initial turn allowed to progress for another time increment. This iterative approach is most conveniently implemented as code for a microprocessor. It does not readily admit to analytic solution, unlike the integral approach.

FIG. 12 is a first diagram of curvature versus time or distance used in an iterative path planning method. In FIG. 12 time is used as the abscissa; speed is assumed constant, so distance could be used instead. The situation depicted is one in which an initial, positive turn has been allowed to progress until point B, at which point the turn is unwound in the opposite direction. Steering angle limits are included in the curvature limit $\pm\theta_{max}$ as steering angle and curvature are related by wheelbase in a truck-like vehicle and by similar parameters in other vehicle types. Steering angle rate limits are included in the maximum slope of $\theta(t)$. The shaded area under the $\theta(t)$ curve (i.e. the time integral of $\theta(t)$) is proportional to heading change; see also (20) above.

Considering FIG. 12 now in detail: At time t=0, curvature $\theta$=0, heading $\phi$=$\phi_i$, and cross track error y=$y_i$. A positive turn is begun at maximum steering angle rate until $\theta$ reaches $\theta_{max}$. $\theta$ remains at $\theta_{max}$ until point B. For each point B, the heading at point C is tested to see if it exceeds a maximum heading constraint. If it has, point B has been incremented too far and the previous increment must be used instead. In FIG. 12, a maximum heading constraint is not reached and curvature is steadily decreased from point B until it reaches the minimum limit, $-\theta_{max}$. FIG. 13, discussed below, shows a case where a maximum heading limit is reached.

For each point B, the part of the diagram in FIG. 12 representing negative curvature, i.e. the part to the right of point C is then constructed such that it has enough area to make the final heading $\phi_f$=0. In other words, the sum of the initial heading $\phi_i$, the accumulated positive heading change (shaded area denoted "+"), and the accumulated negative heading change (shaded area denoted "−") equals zero.

Next the final cross track error $y_f$ is computed. If $y_f$=0, then the problem is solved; if not, then point B is incremented one time step and the procedure just outline is repeated.

FIG. 13 is a second diagram of curvature versus time or distance used in an iterative path planning method. FIG. 13 is similar to FIG. 12. In FIG. 13, however, the initial curvature is not zero so the starting condition is ($\theta_i\neq0\phi_i$, $y_i$). The curvature does not reach $\theta_{max}$, but heading does reach its maximum and this leads to the zero curvature (constant heading) line before point B. Point B is incremented in time until a negative turn can be constructed that results in the final condition ($\theta_f$=0, $\phi_f$=0, $y_f$=0).

The iterative method does not provide a mechanism to decide a priori whether an initial positive or negative (i.e. left or right) turn leads to a shorter joining path. Results obtained from an initial positive turn from a given starting condition may be compared to results obtained from an initial negative turn from the same condition. Whichever initial turn leads to the shorter joining path may then be used in practice.

Figure 14:
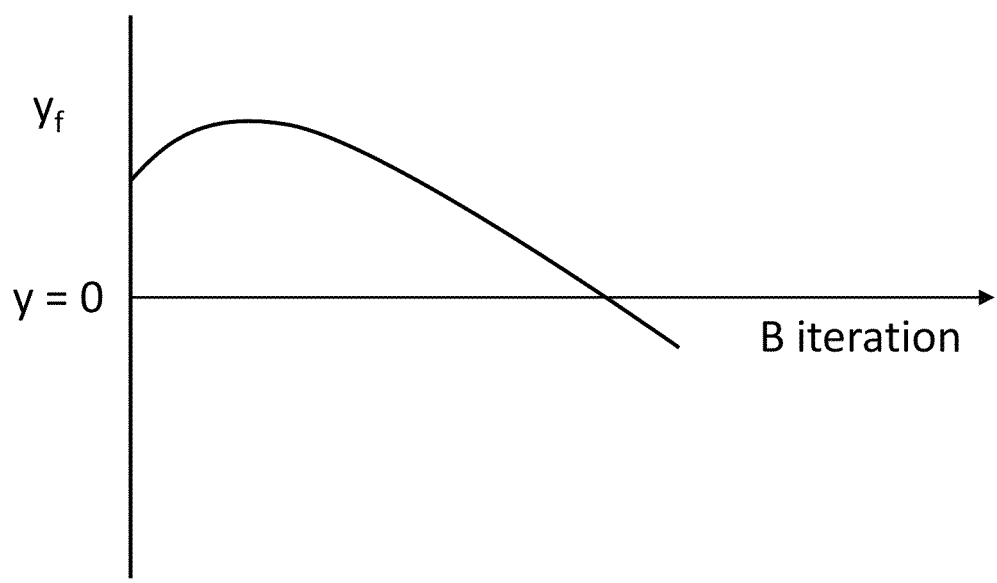
FIG. 14 is an example graph of final cross track error versus iteration number in an iterative path planning method.

The iterative method proceeds until the final cross track error is zero or at least minimized to within a range that can be handled by a conventional feedback autopilot. Cross track error less than the vehicle wheelbase or some other characteristic length may be close enough. FIG. 14 is an example graph of final cross track error versus iteration number. As illustrated in FIG. 14, the final cross track error, $y_f$, may initially increase with further iterations of point B. However, once the cross track error becomes a decreasing function of B iteration number, an estimate of how far B must be incremented to achieve acceptable final cross track error may be obtained without trying every intermediate B iteration. Gradient descent methods may be used to estimate the optimum B, for example.

Paths generated with the iterative method may be used in the path joining planner of FIGS. 6 and 7.

Extensions

Joining paths computed by either the integral or iterative approach may be used in advanced maneuvers. Velocity depending constraints may be included. Either approach may be extended to join desired paths that are not straight lines. Finally, non-optimal joining paths may sometimes be desirable.

A 180 degree turn is an example of a path planning maneuver that has particular applicability in farming. Plowing, fertilizer, seeding and other operations are often performed along a set of parallel rows spanning a field. Upon reaching the end of a row, a farm vehicle turns around and joins the next row. A path planning autopilot can create a joining path from one row to another using the integral or iterative approaches described above.

Figure 15A:
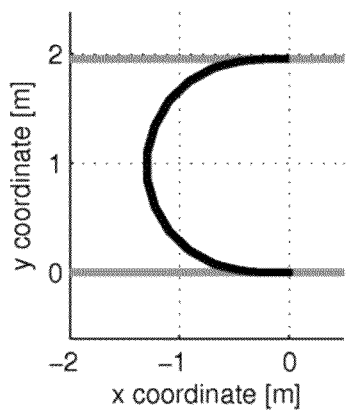
FIGS. 15A-15D illustrate turn-around paths.
Figure 15B:
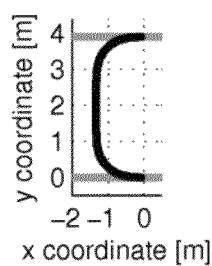
Figure 15C:
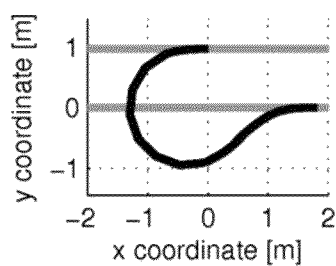
Figure 15D:
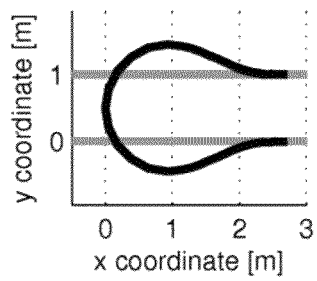

FIGS. 15A-15D illustrate turn-around paths. In each of FIGS. 15A-15D a curved joining path connects two straight line paths, e.g. field rows. The joining path has been computed using methods described above. In FIG. 15A two straight line paths (y=0 and y=2) are just the right distance apart that a maximum curvature joining path connects them without overshoot. In FIG. 15B the straight line paths are farther apart so the joining path includes a perpendicular, straight line section. In FIG. 15C the straight line paths are too close to be joined without overshoot. This path may be followed in either direction so that the overshoot crosses either the starting or ending straight line as desired. In FIG. 15D the joining path overshoots both straight line paths equally. This joining path is constructed by starting at half way point where y=half the distance between straight line paths, $\phi=-\pi/2$, and $\theta=\theta_{max}$ and computing a joining path to the line y=0. This generates half of the joining path shown in the figure; the other half is just the mirror image.

Once any of the joining paths of FIGS. 15A-15D are computed, the distance required for the path in the x direction is known. This information may be used to start the turnaround at an appropriate point such that a vehicle (or an implement towed by it) stays within a boundary as shown in FIG. 3

Turnarounds are an illustrative example of the utility of path planning. There is, of course, no requirement that the straight lines to be joined are parallel. The path planning approaches described above are general and accommodate any initial cross track error, heading and steering angle condition.

Figure 16A:
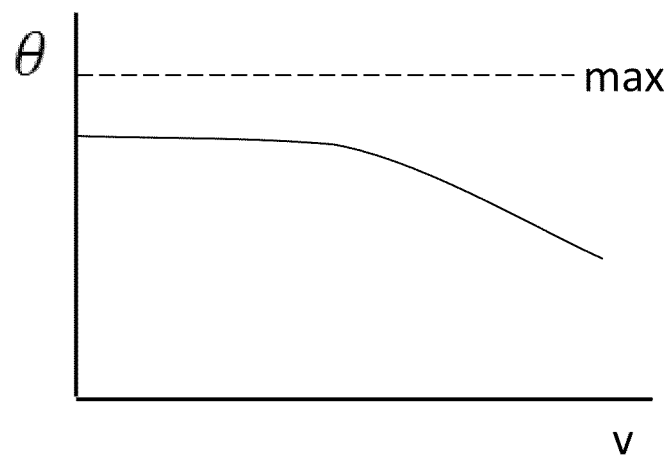
FIGS. 16A and 16B illustrate speed dependent curvature and curvature rate limits.
Figure 16B:
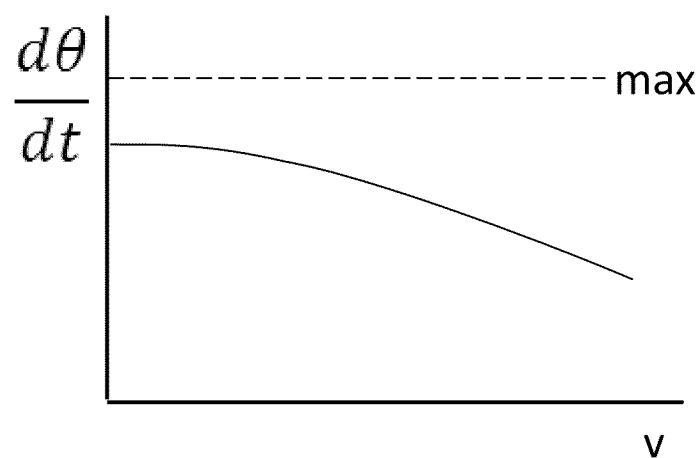

The integral and iterative path planning approaches assume constant vehicle speed. If the speed changes, a new joining path may be computed to take the change into account. For any given vehicle speed maximum limits may be placed on parameters such as curvature and curvature rate. For a typical farm vehicle, these limits correspond to maximum allowed steering angle and steering angle rate. FIGS. 16A and 16B illustrate speed dependent curvature and curvature rate limits.

In FIGS. 16 and 16B, curvature $\theta$ and curvature rate $d\theta/dt$, respectively, are plotted as solid curves versus velocity v. These curves show an example of how an autopilot may be tuned. As vehicle speed increases, curvature and curvature rate decrease. Dashed lines ("max") represent maximum limits in each figure. The shape of the curvature and curvature rate versus velocity curves may be adjusted to suit vehicle operator or autopilot manufacturer preferences.

Curvature vs. velocity and curvature rate vs. velocity may be tuned in several different ways. One way is to drive a vehicle through a series of test maneuvers to discover the vehicle's maximum capabilities at various speeds. The autopilot may record a path followed by the vehicle, including speed, and derive maximum curvature and curvature rate from recorded data. A second way is for the autopilot to accept user input to specify a certain make and model of vehicle with known capabilities. A third way is to ask a vehicle operator to drive the vehicle as aggressively as he would ever want the autopilot to drive it. The autopilot may then record a path followed by the vehicle while the operator is driving and use recorded data to derive maximum operator-desired curvature and curvature rate. Some operators do not realize the full turning capabilities of their vehicles. Matching autopilot performance to operator comfort level helps prevent frightening the operator when he lets the autopilot take over vehicle control.

So far path planning techniques have been described in terms of creating joining paths to straight lines. It is also possible to join curved paths, however. The overall strategy for joining a curve is to use path planning to guide a vehicle close enough to the curve for feedback techniques to take over. First a joining path to the nearest tangent of the curve is created. As the joining path approaches the curve the nearest tangent changes; a new joining path to the new nearest tangent is then created. The process of creating and following joining paths to a nearest tangent may be repeated to construct an overall joining path that ends close enough to the curved path that feedback techniques may be used to guide a vehicle the rest of the way.

Figure 17:
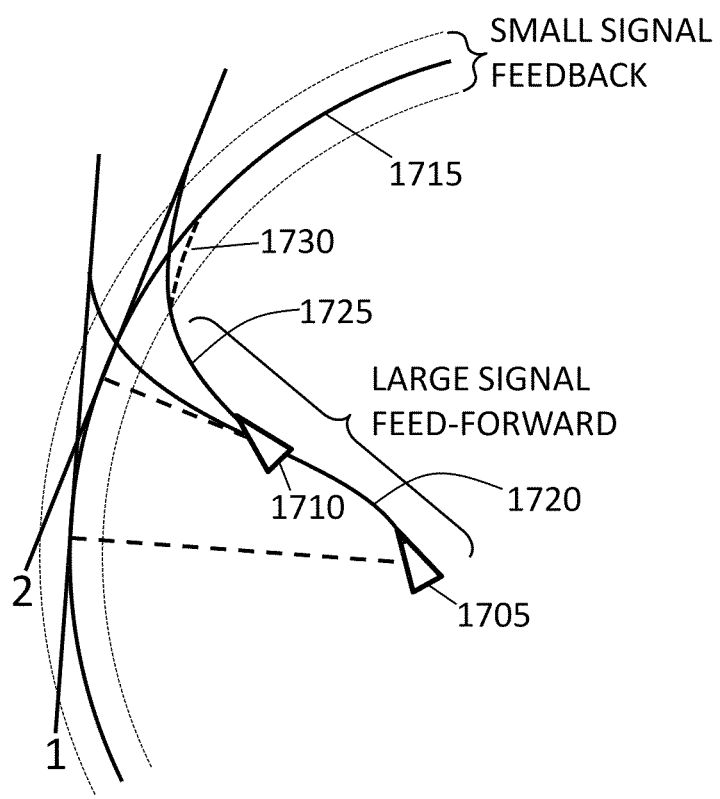
FIG. 17 illustrates an approach to a curved desired path.

FIG. 17 illustrates an approach to a curved desired path. FIG. 17 fixes 1705 and 1710 are indicated by triangles. Curve 1715 is the desired path to be joined. The tangent to the desired path closest to fix 1705 is labeled "1" while the tangent to the desired path closest to fix 1710 is labeled "2". Dashed lines connect each fix to their respective tangent. Curve 1720 is a joining path from the first fix to the first tangent "1", while curve 1725 is a joining path from the second fix to the second tangent "2". Dotted curves on either side of curved path 1715 indicate maximum cross track error considered "close" to the curved path. A vehicle closer to the curved path than either of these two dotted curves may be guided onto the curved path with a small signal feedback autopilot. Farther away, a large signal, feed-forward autopilot, e.g. based on path planning techniques, may be used.

Constructing a joining path to curved desired path 1715 proceeds as follows. Starting at fix 1705, tangent "1" to the nearest point on curve 1715 is computed. Path planning techniques, such as integral or iterative approaches, are used to compute joining path 1720 to tangent "1". Upon reaching fix 1710, tangent "2" to the now nearest point on curve 1715 is computed. Path planning techniques are used to compute joining path 1725 to tangent "2". This process may be repeated as many times as needed to construct a smooth joining path.

After the joining path has been calculated the vehicle follows it under the guidance of an autopilot such as described in connection with FIGS. 4-7. Once the vehicle is close to the curved path it is guided the rest of the way by a feedback autopilot. Dashed curve 1730 is the track that results from feedback guidance to curve 1715.

When or how often to recalculate a new tangent to the current nearest point on the curved desired path may be decided based on how far away from the path the vehicle starts and/or the degree of curvature of the path. A new tangent may also be calculated at regular intervals regardless of distance or path curvature.

As previously mentioned, vehicle speed changes, whether joining a curved or straight desired path, may be accommodated by recalculating a joining path. High-speed maneuvers take more space than low-speed maneuvers, however, and a path planning autopilot may take this into account. When planning a maneuver near a boundary, such as a turnaround at the edge of a farm field, a path planning autopilot may compute a joining path for the current speed and also a higher speed. If currently operating at 50% of the maximum vehicle speed, for example, an additional path appropriate for 90% of the maximum vehicle speed may also be computed. This way the autopilot can provide a margin in case the vehicle operator decides to speed up. Anticipating higher speeds helps prevent becoming stuck in maneuvers that lead to undesirable high-speed joining paths. A path planning autopilot may also be restricted by specifying the maximum curvature rate µ to be less than that prescribed by vehicle absolute limits. Smaller values of µ lead to less sharp turns. Paths may be recalculated whenever heading, curvature or curvature rate limits change.

Figure 18A:
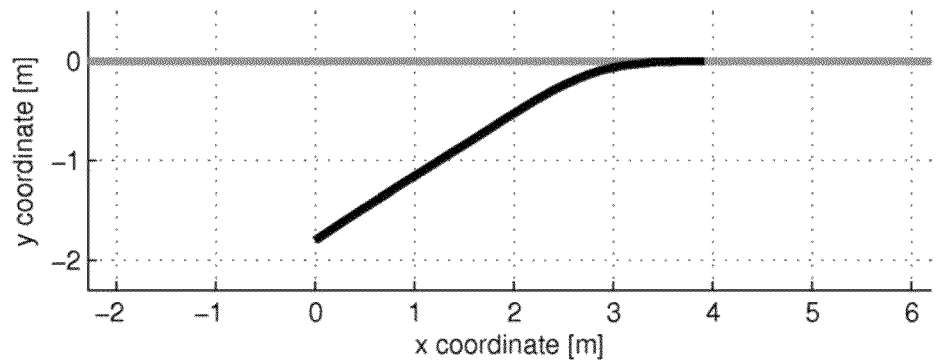
FIGS. 18A and 18B illustrate joining paths that are not necessarily optimal.
Figure 18B:
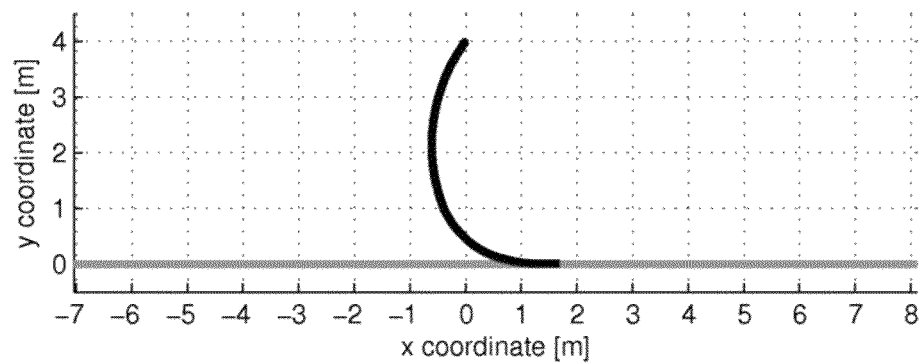

There are some cases when optimal, least-time joining paths may not be desired. FIGS. 18A and 18B illustrate joining paths that are not necessarily optimal. In FIGS. 18A and 18B, the desired path is the line y=0. In FIG. 18A, a joining path starts from approximately (0, −1.8); in FIG. 18B, a joining path starts from approximately (0, 4).

The joining path in FIG. 18A is one that maintains initial heading until getting close enough to the target line (e.g. reaching y) to begin an optimal final turn. This path is not necessarily optimal because a steeper approach to the target line may be allowed. The joining path in FIG. 18B is one that maintains initial curvature until getting close enough to the target line (e.g. reaching y) to begin an optimal final turn. This path is not necessarily optimal because a greater curvature may be allowed. Thus the joining paths of FIGS. 18A and 18B begin with a (possibly) non-optimal and end with an optimal final turn.

Non-optimal paths such as those illustrated in FIGS. 18A and 18B may be desirable from the point of view of operator comfort. In both cases, the non-optimal paths begin by guiding the vehicle to continue doing what it is already doing: no heading change in the case FIG. 18A; no steering angle change in the case of FIG. 18B. This behavior provides a smooth, non-startling transition from operator control to autopilot control of a vehicle. Of course, strategies that lead to non-optimal paths are not desirable if the vehicle does not eventually reach a position (e.g. y) from which an optimal final turn may be made. Maintaining an initial heading, for example, does not work if that heading takes the vehicle away from the target path.

A path planning autopilot and methods for computing joining paths have been described. The autopilot provides efficient vehicle guidance even when a vehicle is far from a desired path. The autopilot also offers direct control over parameters such as steering angle rate without relying on heuristic limits.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for guiding a vehicle to a desired path comprising:
    creating a joining path from an initial vehicle configuration to the desired path, the joining path comprising a first optimal turn; and,
    using an autopilot to steer the vehicle along the joining path.

2. The method of claim 1, the joining path further comprising a line preceding the first optimal turn.

3. The method of claim 1, the joining path further comprising a second optimal turn following the first optimal turn.

4. The method of claim 1, the joining path further comprising a line following the first optimal turn and a second optimal turn following the line.

5. The method of claim 1, the first optimal turn comprising a first clothoid.

6. The method of claim 5, the first optimal turn further comprising a circular arc preceding the first clothoid.

7. The method of claim 5, the first optimal turn further comprising a second clothoid following the first clothoid.

8. The method of claim 5, the first optimal turn further comprising a circular arc following the first clothoid and a second clothoid following the circular arc.

9. The method of claim 1, the desired path being a line.

10. The method of claim 9, the joining path not exceeding a maximum angle $\phi_{max}$ away from the line.

11. The method of claim 1, the joining path not exceeding a maximum curvature $\theta_{max}$.

12. The method of claim 1, the joining path not exceeding a maximum curvature rate µ.

13. The method of claim 1 wherein creating a joining path comprises:
    calculating a distance $\bar{y}(\phi_0, \theta_0)$ traversed perpendicular to the desired path during an optimal turn from the initial vehicle configuration to a configuration having a heading parallel to the desired path and zero curvature, where $\phi_0$ and $\theta_0$ are the vehicle's heading and curvature in the initial vehicle configuration; and,
    calculating the first optimal turn from the initial vehicle configuration to the desired path if the vehicle's cross track error relative to the desired path in the initial vehicle configuration equals $\bar{y}(\phi_0, \theta_0)$.

14. The method of claim 13 further comprising preceding the first optimal turn by a line heading $\phi_0$ if $\phi_0$ equals a maximum approach angle $\phi_{max}$ and $\theta_0=0$.

15. The method of claim 1 wherein creating a joining path comprises:
    calculating the first optimal turn from the initial vehicle configuration to a line inclined with respect to the desired path by a maximum angle $\phi_{max}$;
    continuing the line until reaching a distance $\bar{y}(\phi, \theta)$ traversed perpendicular to the desired path during an optimal turn to a configuration having a heading parallel to the desired path and zero curvature, where $\phi$ and $\theta$ are the vehicle's heading and curvature; and,
    calculating a second optimal turn from the line to the desired path.

16. The method of claim 1 wherein creating a joining path comprises:
    calculating the first optimal turn from the initial vehicle configuration to a line inclined with respect to the desired path by an angle $\phi_{max}$; and,
    calculating a second optimal turn from a point on the first optimal turn to the desired path.

17. The method of claim 16, the point being $\bar{y}(\phi, \theta)$ away from the desired path, where $\bar{y}(\phi, \theta)$ is a distance traversed perpendicular to the desired path during an optimal turn to a configuration having a heading parallel to the desired path and zero curvature, where $\phi$ and $\theta$ are the vehicle's heading and curvature.

18. The method of claim 1 further comprising:
    creating a new joining path from a current vehicle configuration to the desired path whenever vehicle speed changes.

19. The method of claim 1 further comprising:
    creating a new joining path from a current vehicle configuration to the desired path whenever a maximum allowable heading $\phi_{max}$ changes.

20. The method of claim 1 further comprising:
    creating a new joining path from a current vehicle configuration to the desired path whenever a maximum allowable curvature $\theta_{max}$ changes.

21. The method of claim 1 further comprising:
creating a new joining path from a current vehicle configuration to the desired path whenever a maximum allowable curvature rate μ changes.

22. The method of claim 1 further comprising:
creating a new joining path from a current vehicle configuration to the desired path at regular intervals.

23. The method of claim 1, the autopilot comprising a feedback controller and a feed-forward, path joining planner.

24. The method of claim 1, the autopilot comprising a GNSS receiver.

25. The method of claim 1, the autopilot comprising a vehicle heading sensor.

26. The method of claim 1, the autopilot comprising a vehicle steering angle sensor.

27. The method of claim 1, the autopilot comprising a vehicle steering actuator.

28. The method of claim 1, the autopilot comprising a microprocessor and memory.

29. The method of claim 1, the initial vehicle configuration including an initial heading and approximately zero curvature, the desired path being a line parallel to the initial heading but having a heading 180 degrees away, and the joining path being constructed so that it remains within a boundary perpendicular to the desired path.

30. A method for guiding a vehicle to a desired path comprising:
creating a joining path from an initial vehicle configuration to the desired path, the joining path comprising a first turn in a first direction and a second turn in a second direction opposite to the first; and,
using an autopilot to steer the vehicle along the joining path.

31. The method of claim 30, the desired path being a line.

32. The method of claim 31, the joining path not exceeding a maximum angle $\phi_{max}$ away from the line.

33. The method of claim 30, the joining path not exceeding a maximum curvature $\theta_{max}$.

34. The method of claim 30, the joining path not exceeding a maximum curvature rate μ.

35. The method of claim 30, the joining path further comprising a line.

36. The method of claim 30, the joining path having an end at which the joining path and the desired path have the same heading and curvature, and cross track error between the two paths is minimized.

37. The method of claim 30, the first turn comprising a clothoid.

38. The method of claim 30, the second turn comprising a clothoid.

39. A method for guiding a vehicle to a desired path comprising:
(a) creating a first joining path from an initial vehicle configuration to a line tangent to the desired path, the line being tangent at a point on the desired path nearest to the initial vehicle configuration, the joining path comprising a first optimal turn;
(b) repeating step (a) from a point on the first joining path to build an overall continuous curvature joining path that ends close enough to the desired path that feedback techniques may be used to guide the vehicle from the end of the overall joining path the desired path; and,
(c) using an autopilot to steer the vehicle along the joining path.

* * * * *